(12) United States Patent
Wasyluk et al.

(10) Patent No.: US 10,113,536 B2
(45) Date of Patent: Oct. 30, 2018

(54) MODULAR MOLTEN SALT SOLAR TOWERS WITH THERMAL STORAGE FOR PROCESS OR POWER GENERATION OR COGENERATION

(71) Applicant: The Babcock & Wilcox Company, Barberton, OH (US)

(72) Inventors: David T Wasyluk, Magadore, OH (US); Kiplin C Alexander, Wadsworth, OH (US); Kenneth L Santelmann, Seville, OH (US); Jason M Marshall, Wadsworth, OH (US)

(73) Assignee: THE BABCOCK & WILCOX COMPANY, Barberton, OH (US)

( * ) Notice: Subject to any disclaimer, the term of this patent is extended or adjusted under 35 U.S.C. 154(b) by 277 days.

(21) Appl. No.: 14/875,122

(22) Filed: Oct. 5, 2015

(65) Prior Publication Data
US 2016/0097376 A1    Apr. 7, 2016

Related U.S. Application Data

(60) Provisional application No. 62/060,561, filed on Oct. 6, 2014.

(51) Int. Cl.
| | |
|---|---|
| F03G 6/00 | (2006.01) |
| F03G 6/06 | (2006.01) |
| F24S 80/20 | (2018.01) |
| F24S 40/80 | (2018.01) |
| F24S 40/00 | (2018.01) |
| F24S 40/50 | (2018.01) |
| F24S 20/20 | (2018.01) |
| F28D 20/00 | (2006.01) |
| F24S 23/70 | (2018.01) |

(52) U.S. Cl.
CPC .............. *F03G 6/067* (2013.01); *F24S 20/20* (2018.05); *F24S 40/00* (2018.05); *F24S 40/50* (2018.05);
(Continued)

(58) Field of Classification Search
CPC ...... F03G 6/067; F24J 2002/1076; F24J 2/07; F24J 2/4607; F24J 2/4621; F24J 2/4636;
(Continued)

(56) References Cited

U.S. PATENT DOCUMENTS

| | | | |
|---|---|---|---|
| 6,829,894 B2 * | 12/2004 | Bloch | ...................... F01K 13/00 60/646 |
| 7,640,746 B2 * | 1/2010 | Skowronski | .............. F01K 3/18 60/641.8 |

(Continued)

*Primary Examiner* — Jesse Bogue
(74) *Attorney, Agent, or Firm* — Michael J. Seymour

(57) ABSTRACT

Methods of arranging and operating a molten salt solar thermal energy system are disclosed. Molten salt flows from a set of cold storage tanks to solar receivers which heat the molten salt to a maximum temperature of about 850° F. The heated molten salt is sent to a set of hot storage tanks. The heated molten salt is then pumped to a steam generation system to produce steam for process and/or power generation. Lower salt temperatures are useful in processes that use lower steam temperatures, such as thermal desalination. Lower salt temperatures and low chloride molten salt reduce the corrosion potential, permitting the use of lower cost alloys for the solar receivers, hot storage tanks, salt pumps, piping and instrumentation and steam generation system. Multiple sets of modular, shop assembled storage tanks are also used to reduce the amount of salt piping, simplify draining, and reduce field assembly and plant cost.

17 Claims, 13 Drawing Sheets

(52) U.S. Cl.
CPC ............... *F24S 40/80* (2018.05); *F24S 80/20* (2018.05); *F24S 2023/87* (2018.05); *F28D 2020/0047* (2013.01); *Y02A 20/142* (2018.01); *Y02E 10/41* (2013.01); *Y02E 10/46* (2013.01)

(58) Field of Classification Search
CPC ............ F24J 2/4649; F28D 2020/0047; F28D 1/0426; F28D 1/05333; F28D 20/0034; F28D 20/021; Y02E 10/41; Y02E 10/46; Y02E 10/44; Y02E 60/142; Y02E 60/145; F22B 1/006
See application file for complete search history.

(56) References Cited

U.S. PATENT DOCUMENTS

| | | | | |
|---|---|---|---|---|
| 7,955,843 | B2* | 6/2011 | Barringer, Jr. | B01D 61/142 137/240 |
| 7,997,079 | B2* | 8/2011 | Seidel | F28D 20/0039 60/645 |
| 2005/0126170 | A1* | 6/2005 | Litwin | F03G 6/065 60/641.8 |
| 2009/0038608 | A1* | 2/2009 | Caldwell | F24S 30/48 126/600 |
| 2010/0263709 | A1* | 10/2010 | Norman | F24J 2/07 136/246 |
| 2012/0080168 | A1* | 4/2012 | Hemrle | F01K 3/12 165/104.19 |
| 2012/0240577 | A1* | 9/2012 | Mandelberg | F03G 6/067 60/641.15 |
| 2013/0147197 | A1* | 6/2013 | Goebel | F01K 3/12 290/52 |
| 2013/0298557 | A1* | 11/2013 | Treece | F03G 6/06 60/641.15 |
| 2013/0312411 | A1* | 11/2013 | Newman | F03B 17/00 60/641.8 |
| 2014/0075939 | A1* | 3/2014 | Aga | F01K 3/12 60/641.11 |
| 2014/0352304 | A1* | 12/2014 | Arias | F03G 6/067 60/641.15 |

* cited by examiner

MODULAR MOLTEN SALT SOLAR TOWERS WITH THERMAL STORAGE FOR PROCESS OR POWER GENERATION OR COGENERATION

CROSS-REFERENCE TO RELATED APPLICATIONS

This application claims priority to U.S. Provisional Patent Application Ser. No. 62/060,561, filed on Oct. 6, 2014. The complete disclosure of this patent application is hereby fully incorporated by reference in its entirety.

BACKGROUND

The present disclosure primarily relates to a system that produces and stores thermal energy from the sun for processes such as thermal desalination or electricity generation. Generally, a solar receiver is a component of a solar thermal energy generation system whereby radiation from the sun (i.e. sunlight) is used as a heat source. The radiation and heat energy from the sun is concentrated on the solar receiver and is transferred to a heat transfer fluid (HTF) flowing through the receiver which can be stored and used to generate steam for a process or for power generation or for both (cogeneration). The receiver is usually a large unit permanently mounted on top of an elevated support tower that is strategically positioned in a field of heliostats, or mirrors, that collect rays of sunlight and reflect and concentrate those rays on to the tube panels of the receiver. An efficient, compact solar receiver for such systems which uses molten salt or a similar HTF and which is simple in design, modular, rugged in construction, and economical to manufacture, ship, and install would be desirable.

Currently wind and solar photovoltaic power generators do not have economical energy storage capability. Without energy storage, fluctuations on the grid are inevitable due to changing winds, clouds, and darkness at night. A molten salt solar plant is able to efficiently store the collected solar energy as thermal energy, which allows the process or power generation to be decoupled from the energy collection. The process or power plant can then continue to operate as needed, such as during cloud cover and at night, for some amount of time depending on the number of receiver towers and size of the thermal storage system relative to the amount of energy required by the process or power cycle.

BRIEF DESCRIPTION

The present disclosure primarily relates to solar thermal energy generation systems that use solar receivers to absorb solar energy and certain storage tank structures for storage of the HTF to provide thermal energy for process and/or power generation. Preferably, the systems use molten salt as the HTF and storage fluid.

Disclosed in various embodiments are methods of operating a solar thermal energy generation and storage system. The HTF (e.g. molten salt) is pumped from a set of cold storage tanks to a solar receiver. The HTF is heated to a maximum temperature of about 850° F., and then flows by gravity to a set of hot storage tanks. The heated fluid is then pumped to steam generation system to provide thermal energy to generate steam for a process and/or to drive a turbine and generate electricity. Molten salt systems designed specifically to produce electricity use higher temperature molten salt, typically 1050° F., needed to meet the steam temperatures required by conventional utility scale steam turbines and to provide a more efficient power cycle. However, processes such as thermal desalination do not require high temperature working fluids. Therefore, the maximum temperature of the HTF (molten salt) in this disclosure is selected to be less than could be achieved, so that the solar receiver, hot salt piping, hot salt storage tank, hot salt piping and steam generation system (SGS) heat exchangers can be made from lower-grade alloys, thus reducing the cost of the plant. Alternately, the thermal energy can be used to generate steam to drive a turbine and produce electricity, but with lower power cycle efficiency due to lower steam temperatures resulting from lower salt temperature.

Disclosed in other embodiments are solar thermal energy generation and storage systems and steam generation systems that include one or more vertical receiver towers. The at least one solar receiver includes a vertical support structure that supports multiple tube panels, which can be arranged in quadrants. The tube panels are fluidly connected to form at least one flow path. A plurality of heliostats is arranged around the vertical tower. A set of cold storage tanks is configured to supply "cold" HTF to the solar receiver(s). A set of hot storage tanks is configured to receive "hot" HTF from the solar receiver(s).

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
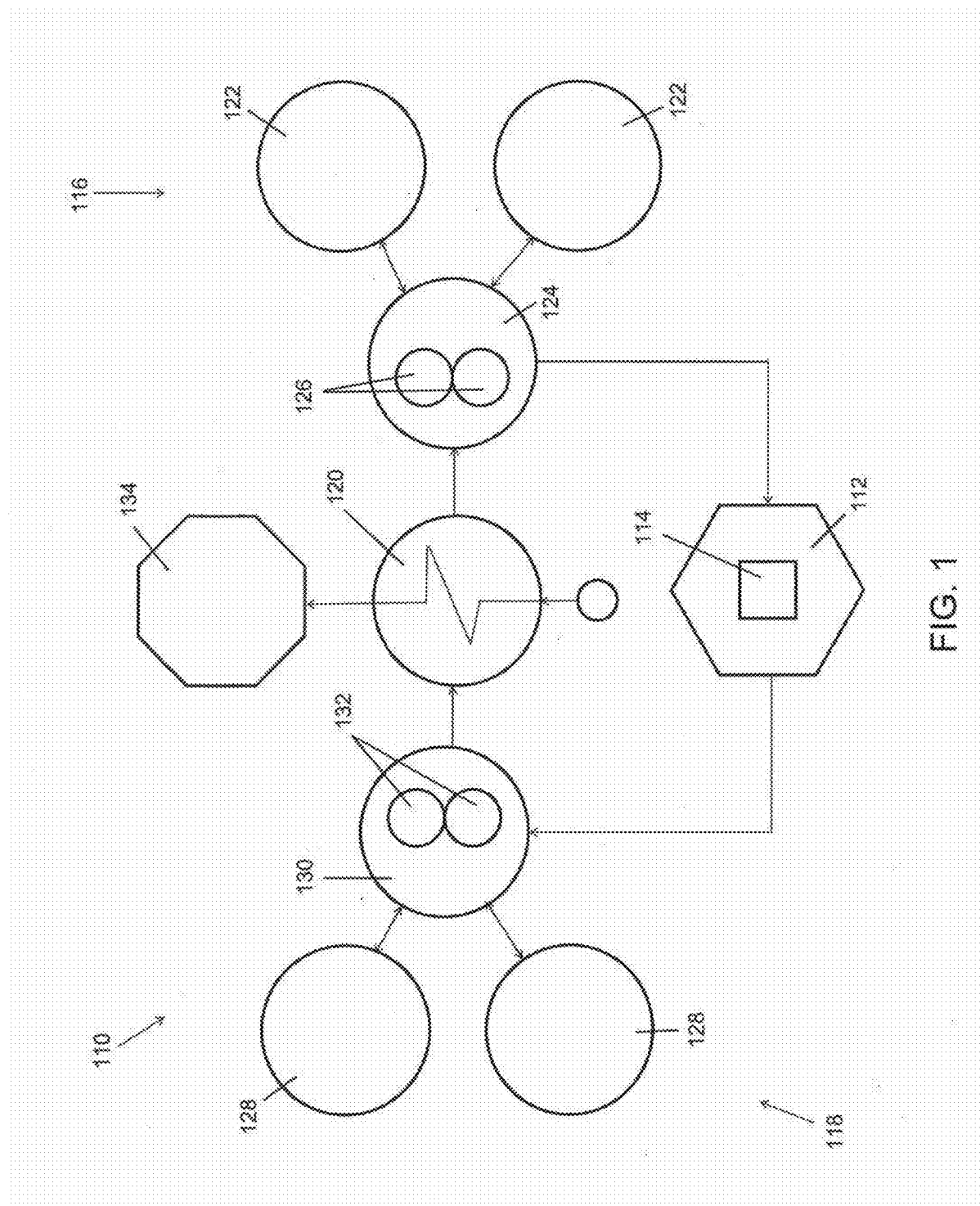
FIG. 1 is a schematic view of a molten salt solar thermal energy generation, thermal storage and steam generation system of the present disclosure.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

It should be noted that many of the terms used herein are relative terms. For example, the terms "inlet" and "outlet" are relative to a direction of flow, and should not be construed as requiring a particular orientation or location of the structure. The terms "upstream" and "downstream" are relative to the direction in which a fluid flows through various components, i.e. the fluid flows through an upstream component prior to flowing through the downstream component. It should be noted that in a loop, a first component can be described as being both upstream of and downstream of a second component. Similarly, the terms "upper" and "lower" are relative to each other in location, i.e. an upper component is located at a higher elevation than a lower component.

In addition, the terms "north" and "south" are used to indicate locations that are opposite each other, as are "east" and "west". These directional terms are relative to each other, and should not be construed as referring to an absolute direction with reference to the geographic or magnetic North Pole of the earth.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or the terms "roof" and "floor" are used to refer to locations/surfaces where the top/roof is always higher than the bottom/floor relative to an absolute reference, i.e. the surface of the earth. The terms "upwards" and "downwards" are also relative to an absolute reference; an upwards flow is always against the gravity of the earth.

The term "plane" is used herein to refer generally to a common level, and should be construed as referring to a volume, not as a flat surface.

A fluid at a temperature that is above its saturation temperature at a given pressure is considered to be "superheated." A superheated fluid can be cooled (i.e. transfer energy) without changing its phase. As used herein, the term "wet steam" refers to a saturated steam/water mixture (i.e., steam with less than 100% quality where quality is percent steam content by mass). As used herein, the term "dry steam" refers to saturated steam having a quality equal to 100% (i.e., no liquid water is present) or superheated steam.

The present disclosure relates to the capture of solar energy by a HTF. The HTF will be referred to as "cold" or "hot" in describing the various stages of the solar energy collection and storage methods discussed herein. It should be understood that "cold" and "hot" are used as relative terms. "Cold" is used to refer to the fluid prior to capturing solar energy, or after solar energy has been released. "Hot" is used to refer to the fluid after solar energy has been captured. There is usually a difference of at least 100° F. between a "cold" fluid and a "hot" fluid.

To the extent that explanations of certain terminology or principles of the solar receiver, boiler and/or steam generator arts may be necessary to understand the present disclosure, the reader is referred to *Steam/its generation and use,* 42nd Edition, edited by G. L. Tomei, Copyright 2015, The Babcock & Wilcox Company (ISBN 978-0-9634570-2-8), Wilcox Company, the text of which is hereby incorporated by reference as though fully set forth herein.

The present disclosure relates to a solar receiver design that can be used with Concentrated Solar Tower technology, also known as Concentrating Solar Power (CSP) technology. Generally, the solar receiver is located at the top of a vertical tower which rises above a ground level or grade for a height often exceeding 150 feet. The solar receiver includes a vertical support structure. Buckstays can be provided on the vertical support structure to provide lateral support for an arrangement of heat transfer surfaces, particularly loose tangent tube panels, while allowing for unrestrained thermal expansion of the tubes/tube panels in both the horizontal and vertical directions, thereby eliminating additional tube stresses.

The vertical support structure, buckstays, and other structural members not only provide structural support and rigidity for the tubes/tube panels of the heat transfer surfaces, but also a means by which the solar receiver can be picked up and lifted for placement at a desired location. The structure permits the solar receiver to be shop-assembled, transported, and then lifted and set upon the vertical tower as a unit during installation. The vertical support structure remains with the solar receiver, thereby facilitating (if necessary) the removal of the solar receiver from the tower should it become desirable to do so.

The receiver is an assembly of tubes that uses molten salts as the HTF flowing inside the tubes. At grade, a field of mirrors (called heliostats) track the sun's movement and focus sunlight onto the heat transfer surfaces of the receiver. The HTF inside the tubes of the receiver absorbs the concentrated solar energy, causing the HTF to increase in temperature, so that the HTF captures the solar energy. It is contemplated that the systems of the present disclosure will use a low freeze point, low chloride molten salt as the HTF and storage medium. This will allow the use of lower cost alloys with reasonable corrosion allowances.

Competitor systems typically use a single, large, field-erected receiver in the middle of a single field of heliostats. However, the solar receiver of the present disclosure is contemplated to be incorporated in a plant that takes a modular approach, using several smaller solar receivers that produce an output that is equivalent to that of a single large receiver. In particular, this smaller size allows for shop assembly, or in other words the solar receiver can be shipped to the field site as one assembled piece, rather than as several smaller pieces that are assembled together at the field site. This improves quality, minimizes field labor costs, allows for faster installation once the receiver is onsite, and eases permitting since the towers are typically shorter. The modular approach further allows for a scalable plant size that may be changed by simply changing the quantity of towers and receivers. Plant risk is also reduced because the same receiver design can be used to scale the plant up or down; the design does not need to be changed. In addition, multiple receivers provide redundancy in that if one receiver is down for maintenance, the plant can still operate.

This solar receiver applies many concepts such as: shop assembly, modularity, heat transfer surfaces using top supported loose tangent tubes and headers arranged for an alternating up-down serpentine flow, a tube attachment/floating buckstay system, and a light barrier behind the tube panels, among others.

"Cold" molten salt, at an inlet temperature of about 350° F. (177° C., 450° K) or lower (depending on the freeze point of the salt), is pumped from a set of cold storage tanks into the tube panels of the solar receiver. The solar energy focused on the tube panels heats the molten salt to an outlet temperature of about 750° F. (399° C., 672° K) to about 850° F. (454° C., 728° K) or lower depending on the steam temperature requirements. Upon exiting the solar receiver, this "hot" molten salt is returned to grade level and stored in a set of hot storage tanks. This completes the energy collection process.

The "hot" molten salt in the set of hot storage tanks is then pumped to a steam generation system. This is a system of tube and shell heat exchangers that transfers the thermal energy from the hot molten salt to water in order to produce saturated steam or superheated steam. The steam can be used for various non-power processes such as enhanced oil recovery (EOR), thermal desalination, or for electricity generation that aim to use solar thermal energy to offset or possibly eliminate fossil fuel costs. The cooled salt returns to the cold storage tanks and is recirculated through the solar receivers.

The shop-assembled solar receiver of the present disclosure is advantageously comprised of an arrangement of heat transfer surfaces and fluid conveying conduits (pipes, valves, etc.) and associated controls arranged in a particular fashion to transfer a desired amount of heat energy into the HTF (i.e. molten salt). The heat transfer surfaces are advantageously made of tubes arranged into tangent tube panels, and are provided with inlet and outlet headers as required. As is known to those skilled in the art, the sizes of tubes, their material, diameter, wall thickness, number and arrangement for the heat transfer surfaces are based upon temperature and pressure for service, according to applicable design codes. Required heat transfer characteristics, spot absorption rates, mass flow rates of the HTF within the tubes, etc. are also important parameters which must be considered. Depending upon the geographic location where the solar receiver is to be installed, applicable seismic loads and design codes are also considered.

For conventional utility scale power generation, solar receivers are designed to heat molten salt up to a temperature of 1050° F. to meet the steam temperature requirements of conventional utility scale steam turbines and to provide an efficient power cycle. The high temperature molten salt requires extensive use of high temperature alloys throughout the solar plant and large field erected storage tanks. In the methods/processes of the present disclosure, as described in more detail below, the HTF is only heated to a maximum temperature of about 850° F., instead of 1050° F. This temperature will satisfy the steam requirements for most process (non-power) applications. For example, 850° F. salt can generate 635° F. saturated steam at 1988 psia. Lower salt temperatures reduce metal temperatures and when combined with lower chloride salt (described in next paragraph) can significantly reduce the potential for corrosion. This in turn allows lower grade alloys such as austenitic stainless steel SA213TP347H to be used for the receiver absorber tubes (heat transfer surfaces) of the tube panels instead of costly high nickel-chrome superalloys. Lower salt temperatures also allow lower grade chromium-molybdenum alloys such as SA335P22 and SA387Gr22 or even carbon steel (if the required steam temperature, and thus salt temperature, are low enough) to be used for the hot salt piping, hot storage tanks and associated pumps, heaters, valves and instrumentation and SGS heat exchangers instead of austenitic stainless steel. Also, the heat flux on the receiver outlet tube panels no longer has to be reduced because the temperature of the salt film on the inside of the tubes is below the 1112° F. (600° C.) limit where nitrates begin converting to corrosive nitrites. This allows higher average flux and with lower molten salt outlet temperatures helps to minimize the overall size of the solar receiver. Smaller, lower temperature receivers also have lower thermal losses (i.e. higher thermal efficiency), which in turn can reduce the size and cost of the heliostat field.

The system of the present disclosure also uses a low freeze point (288° F. (142° C.) or lower), low chloride (0.40% by weight or lower) molten salt mixture to allow operation at lower temperatures and reduce the potential for corrosion at the upper temperature limit (850° F.). If used in conjunction with salt temperatures of about 850° F. or lower, it can significantly reduce the potential for corrosion of the molten salt components. This in combination with lower salt temperatures allows the hot salt piping, hot storage tanks, pumps, valves, heaters and instrumentation and SGS heat exchangers that comes into contact with the heated salt to be downgraded from austenitic stainless steel alloys like SA213TP347H ("347H") to chrome-molybdenum steel alloys such as SA335P22 ("P22") or SA387Gr22, or to even carbon steel if the required steam temperature (and thus salt temperature) is low enough. For example, reducing the hot salt piping material from 347H to P22 would reduce the material cost by approximately 50%. This estimate includes a 0.100 inch corrosion allowance added to the P22 (with standard 0.36 wt % silicon) pipe thickness to achieve a 30 year design life. P22 can also be specified with higher silicon content which can further reduce the corrosion, possibly allowing even thinner piping and lower cost.

The SGS heat exchangers such as the superheater or the reheater can be made from a chromium-molybdenum steel alloy, carbon steel, or a metal of lower grade than austenitic stainless steel. The evaporator can also be downgraded from chromium-molybdenum steel to carbon steel, for example.

Low alloy steels like P22 are also more readily available and not prone to stress corrosion cracking like 347H. They are also easier to weld than 347H which may provide additional cost savings during field installation. Although lower grade metals would need to be thicker (due to lower allowable stress) and therefore require more heat trace power to preheat, this cost should be insignificant because the piping is not drained that often over the life of the plant. In addition, P22 and carbon steel have a 17% lower coefficient of thermal expansion and, combined with lower operating temperatures, can reduce the number of expansion loops required in the salt piping. Although P22 and carbon steels have significantly higher thermal conductivity than 347H, the thicker pipe wall required for these materials should offset the higher conductivities resulting in similar insulation thickness requirements.

In prior solar molten salt thermal storage system designs, two large field-assembled tanks would be used for cold and hot storage of the HTF. Those tanks could be as large as 130 feet in diameter and over 70 feet in height, and required special passive air-cooled foundations, and required extensive field labor and time to erect. Such tanks typically have three 50% capacity, long shafted, multiple-stage vertical turbine pumps mounted on a separate structure above the tanks, and pumped salt from the bottom of the tank. In addition, such large hot storage tanks are typically made of austenitic steel and have some risk of stress-relaxation cracking in the final assembly welds because those areas could not be properly stress relieved. The present disclosure instead uses multiple, shop-assembled, truck-shippable salt storage tanks. This approach could significantly reduce field installation cost and time. The only field work required would generally include setting the tanks on the foundations and installing connecting piping, valves, pumps, heaters and instrumentation.

In particular, there is one or more sets of cold storage tanks and one or more sets of hot storage tanks, which can be locally or centrally located and shared between solar receiver towers. In each set, one tank serves as a pump tank and has pumps for moving the HTF. The other storage tanks do not contain pumps. Depending on the required storage capacity, one or more storage tanks are located next to the pump tank and fluidly connected thereto with piping near the bottom of the tanks. The fluid flows into and out of the pump tank, and then flows through connecting pipes into their respective storage tanks, allowing the liquid level to be the same in each tank. This arrangement eliminates the need for pumps on each tank. The required quantity of storage tanks depends on the required storage capacity and the size of the individual tanks. Using the maximum size tank is desirable in order to minimize the quantity of tanks needed. Tank sizing would be determined on a case by case basis depending on manufacturing and/or shipping size limits. Also, taller tanks may need to be anchored to the foundation and/or braced together to prevent tipping from wind and earthquake loads.

Advantageously, the present disclosure reduces the cost of the system by: (1) limiting salt temperatures to 850° F. (instead of 1050° F.) allowing lower alloy components to be used; (2) eliminating the restriction on heat flux on receiver outlet panels to allow higher average flux and smaller receiver size; (3) using smaller receivers with lower operating temperatures that have lower thermal losses and are more efficient, resulting in smaller, lower cost heliostat fields; (4) reducing the corrosion potential with lower operating temperatures and using low chloride molten salts, thereby allowing lower grade alloys in the receiver tube panels, interconnecting piping, hot salt piping, hot storage tanks and associated pumps, heaters, valves and instrumentation and SGS heat exchangers; (5) using lower grade alloys, such as P22 that are easier to weld than stainless 347H; (6) using lower grade alloys, such as P22, that have 17% lower coefficient of thermal expansion compared to 347H, to reduce the number of expansion loops in the hot salt piping; (7) eliminating reheater and superheater heat exchangers if only saturated steam is required; and (8) using modular shop-assembled, low alloy storage tanks to reduce field installation costs and eliminate field welding and the risk of strain age and stress corrosion cracking.

FIG. 1 illustrates a top view of one modular molten salt solar thermal energy generation system 110 contemplated by the present disclosure. It is emphasized again that these drawings are not to scale. A plurality of heliostats is arranged in a field 112 (represented by a hexagon) around the solar receiver 114. The heliostats track the sun's movement and focuses sunlight onto the heat transfer surfaces of the solar receiver 114. Again, the system can include multiple solar receivers and heliostat fields, though only one solar receiver and one heliostat field is illustrated here. A set of cold storage tanks 116 and a set of hot storage tanks 118 are fluidly connected to the solar receiver 114.

The set of cold storage tanks 116 is configured to supply HTF to the solar receiver 114, as described in more detail below. The set of cold storage tanks 116 includes at least one cold fluid storage tank 122 configured to hold HTF and at least one cold fluid pump tank 124. The cold fluid storage tanks 122 are fluidly connected to the cold fluid pump tank 124 through piping at the bottom of the tanks, such that the level of fluid in the tanks 122/124 is the same. The cold fluid storage tanks 122 do not contain a pump, and are fluidly connected only to the cold fluid pump tank 124, and are not directly connected to the solar receiver 114. The cold fluid pump tank 124 is fluidly connected to the solar receiver 114 and includes at least one pump 126 for pumping "cold" fluid to the solar receiver 114. The cold fluid pump tank 124 is also fluidly connected to the steam generation system 120 for receiving "cold" fluid therefrom. As illustrated here, two cold fluid storage tanks 122 and one cold salt pump tank 124 are used. However, the set of cold storage tanks 116 can include any number of cold fluid storage tanks 122 or cold salt pump tanks 124 (e.g., 1, or 3 or more). Desirably though, only one cold salt pump tank 124 is used. Each cold storage tank 116 has a height of about 100 feet or less and a diameter of about 14 feet or less. These dimensions permit the cold storage tanks to be truck-shippable. It is noted that the tanks are contemplated with the 100 feet height being the vertical dimension; however, the tanks can also be horizontally oriented. The tanks are usually of a cylindrical shape.

The set of hot storage tanks 118 is configured to receive HTF from the solar receiver 114, as described in more detail below. The set of hot storage tanks 118 includes at least one hot fluid storage tank 128 configured to hold HTF and at least one hot fluid pump tank 130. The hot fluid storage tanks 128 are fluidly connected to the hot fluid pump tank 130 through piping at the bottom of the tanks, such that the level of fluid in the tanks 128/130 is the same. The hot fluid storage tanks 128 do not contain a pump, and are fluidly connected only to the hot fluid pump tank 130, and are not directly connected to the solar receiver 114. The hot fluid pump tank 130 is fluidly connected to the solar receiver 114 and includes at least one pump 132 for pumping "hot" fluid to the steam generation system 120. The hot fluid pump tank 130 is also fluidly connected to the steam generation system 120 for sending "hot" fluid thereto. As illustrated here, two hot fluid storage tanks 128 and one hot salt pump tank 130 are used. However, the set of hot storage tanks 118 can include any number of hot fluid storage tanks 128 or hot salt pump tanks 130 (e.g., 1, or 3 or more). Desirably though, only one hot salt pump tank 130 is used. Each hot storage tank 118 has a height of about 100 feet or less and a diameter of about 14 feet or less. These dimensions permit the hot storage tanks to be truck-shippable. It is noted that the tanks are contemplated with the 100 feet height being the vertical dimension; however, the tanks can also be horizontally oriented. The tanks are usually of a cylindrical shape.

The set of cold storage tanks 116 and the set of hot storage tanks 118 are also fluidly connected to a steam generation system 120 that receives "hot" fluid from the set of hot storage tanks to generate steam, and then sends the "cold" fluid to the set of cold storage tanks, as described in more detail below. The generated steam can then be used for various applications, as represented by octagon 134.

Figure 2:
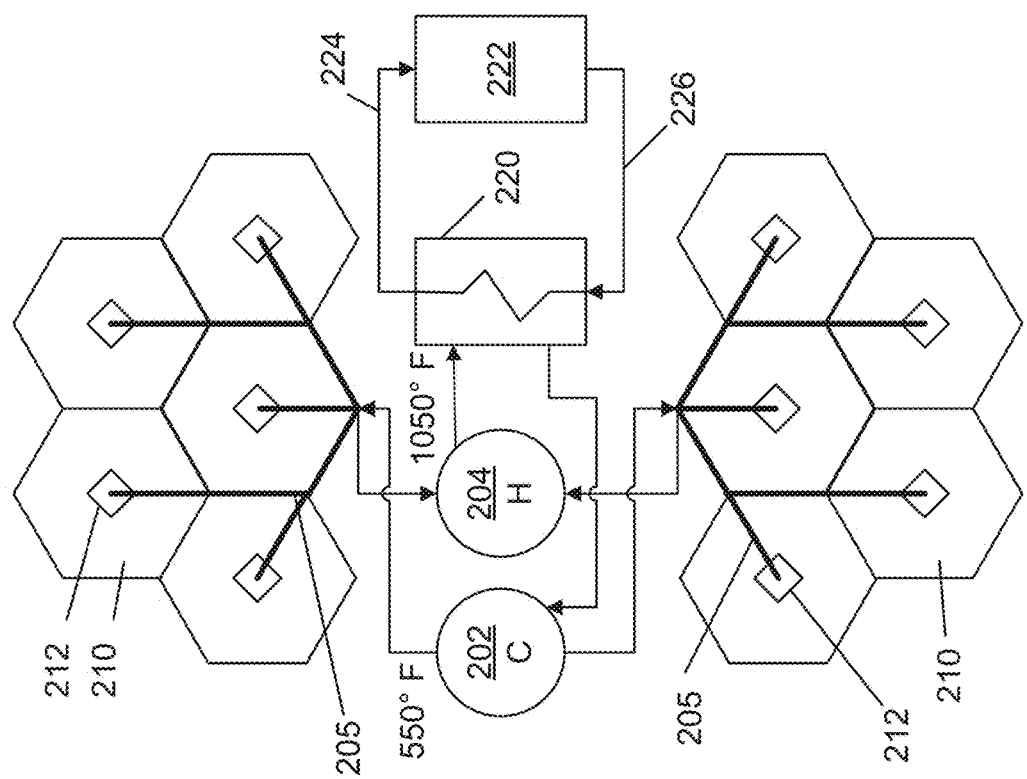
FIG. 2 is a schematic diagram of a conventional molten salt power plant with a centrally located thermal storage system, steam generation system, and power generation system and ten heliostat fields, operated at temperatures of about 1050° F.

Initially, FIG. 2 is a schematic diagram for a layout of a conventional molten salt solar power plant 200 that uses ten solar receiver towers 212, each solar receiver being located at approximately the center of a hexagonal heliostat field 210 and each solar receiver being operated to heat the fluid from 550° F. (288° C., 561° K) up to a temperature of 1050° F. (565° C., 838° K). Two large field erected storage tanks, one for cold fluid (202) and one for hot fluid (204), are located between the two sets of heliostat fields in a central location. This system uses conventional nitrate solar salt having a high freeze point. The salt is a near eutectic mixture of 60% sodium nitrate and 40% potassium nitrate by weight with a freeze point of 430° F. (221° C., 494° K).

As indicated here, HTF flows from the cold tank 202 to piping 205. The dark lines 205 indicate the path taken by the cold and hot salt piping that is needed to transport the HTF (e.g. molten salt) to and from each solar receiver. (Note that a single line is shown for the molten salt piping to improve clarity, but in reality there are two pipes, a cold pipe and a hot salt pipe going to and coming from each receiver. The cold salt and hot salt piping from the tanks to the receivers can be individual runs, branched manifolds, or a combination thereof.). The HTF then returns from the solar receiver and flows by gravity to hot tank 204.

Although the cold storage tank and the pumps, piping and valves exposed to only cold fluid can be made of lower-quality alloys such as carbon steel, the same components and the SGS heat exchangers exposed to hot fluid of 1050° F. would need to be made of high grade stainless steel and the receiver tubes of high nickel-chrome alloy to minimize high temperature salt corrosion. This increases costs. In addition, the long runs of piping between the central storage tanks and the solar receivers make it difficult to completely drain the piping by gravity back to the storage tanks. To do so, the piping would have to be elevated significantly at the towers to achieve the proper slope for draining. Such elevation would add significant cost (for the supporting structures) and would block some of the light of the heliostat field from reaching the solar receiver. In addition, compressed air might be needed to assist drainage, and P-traps might need to be installed in the piping to prevent the air from flowing over the fluid in the piping.

Next, the hot fluid from the hot tank 204 is sent to a steam generation system 220, where feedwater 226 is converted to steam 224 and sent to a power generation system 222, and then recycled. The steam generation system will typically consist of preheater, evaporator, superheater, and reheater heat exchangers.

These molten salt power plants could have a capacity of 100 MWe at 50% capacity factor. The capacity factor, expressed in percent, is the annual net generation of a plant divided by the annual net generation of the plant if the turbine ran at its rated capacity for the entire year. Plants designed for a lower capacity factor use fewer solar receivers and less storage capacity, and vice versa.

FIGS. 3-7 are various embodiments of molten salt solar thermal energy generation plants of the present disclosure, which are operated at salt temperatures of about 850° F. or lower. It is noted again that these drawings are not to scale. Heliostat fields and a central location are illustrated in these drawings. It is contemplated that the central location is about the same size as a heliostat field, although in these drawings the central location is much larger and the heliostat fields are spaced further apart, so that relevant details of the central location are more visible.

Figure 3:
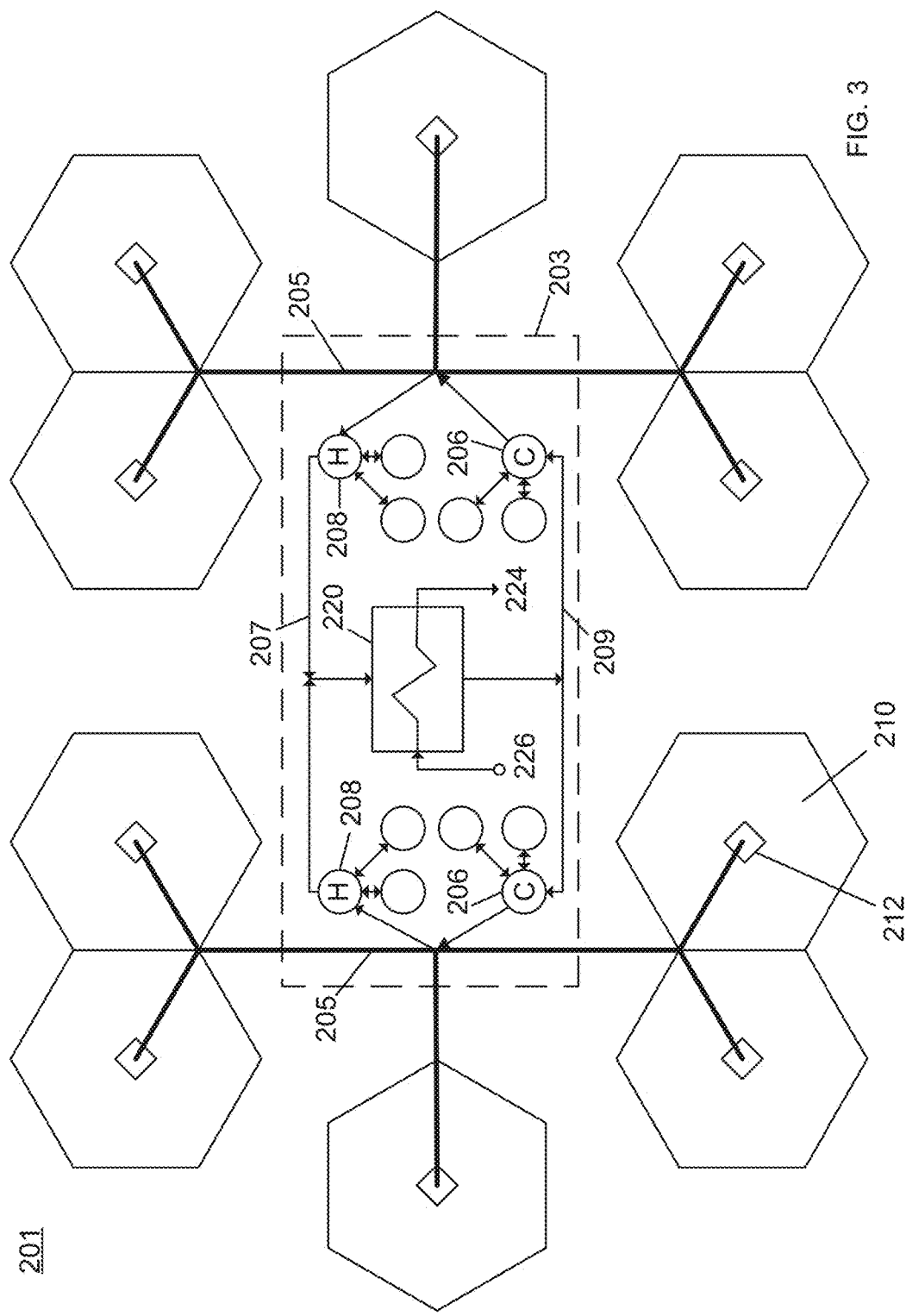
FIG. 3 is a schematic diagram of a molten salt solar thermal energy generation system of the present disclosure, operated at temperatures of about 850° F. or lower, used for process applications.

FIG. 3 is one exemplary embodiment of a molten salt solar thermal energy generation plant 201 of the present disclosure, operated at temperatures of about 850° F. or lower, used for process applications. In this embodiment, the heliostat fields 210 are arranged on all sides of the central location (dotted rectangle 203) along a single perimeter, as opposed to the double perimeter of FIG. 2. As illustrated here, the layout of the heliostat fields are in the shape of a rectangle surrounding the central location 203, with four heliostat fields on opposite sides and then one heliostat field on each end of the central location 203. (Note: A total of ten heliostat fields and towers are shown here, but there can be more or less towers depending on the plant storage and output requirements). Again, central location 203 is about the same size as each heliostat field 210. Located within the central location 203 are two sets of cold storage tanks 206 and two sets of hot storage tanks 208. Each set of storage tanks 206, 208 is fluidly connected to five heliostat fields 210. Cold fluid flows from the sets of cold storage tanks 206 through piping 205 to the heliostat fields 210, where the fluid is heated to a temperature of about 850° F., and then returns to the sets of hot storage tanks 208. The hot fluid then flows from the two sets of hot storage tanks 208 through piping 207 to the steam generation system 220, and exits therefrom as cold fluid, which flows through piping 209 to the two sets of cold storage tanks 206. Feed water 226 also flows into the steam generation system 220 and absorbs heat energy, exiting as steam 224, which is then sent to process applications as desired. The steam generation system may be made up of (i) only an evaporator; (ii) a preheater and an evaporator; or (iii) a preheater, an evaporator, and a superheater. The steam 224 can be saturated steam or superheated steam. One advantage of this layout is the total length of piping can be reduced. As a very rough comparison, in FIG. 2 the heliostat field piping has a total length of 18 hexagon sides, while in FIG. 3 the piping has a total length of 10 hexagon sides (keeping in mind that the lengths in the central location are not to scale). In addition, the length of piping between the solar receivers and the storage tanks is much shorter. This means the piping can be elevated at the base of the solar receiver towers to obtain the minimum slope needed for gravity drainage (thus eliminating the need for P-traps and compressed air forced drainage) without blocking as much light from the heliostat fields. Also, the piping can be supported close to the ground, reducing the amount and cost of the supporting structures.

Figure 4:
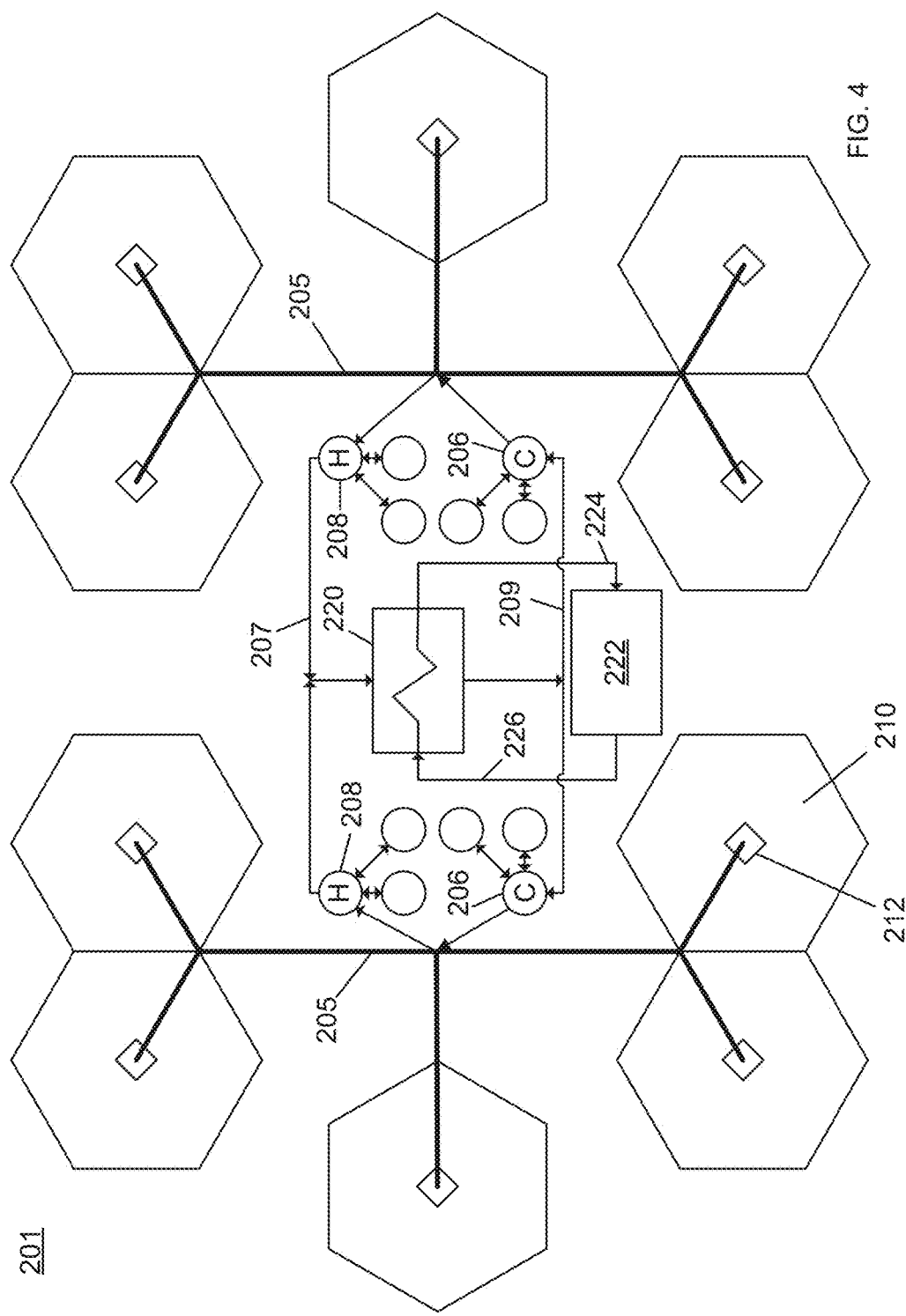
FIG. 4 is a schematic diagram of a molten salt solar thermal energy generation system of the present disclosure, operated at temperatures of about 850° F. or lower, used for power generation.

FIG. 4 is an exemplary embodiment of a molten salt solar thermal energy generation system 201 of the present disclosure, operated at temperatures of about 850° F. or lower, used for power generation. This drawing is the same as FIG. 3, except that the steam 224 is sent to a power generation system 222, where the heat energy is converted to electrical power and the steam is condensed back to water, which is then recycled as feed water 226. The power generation system 222 includes a turbine, generator and a control center.

Figure 5:
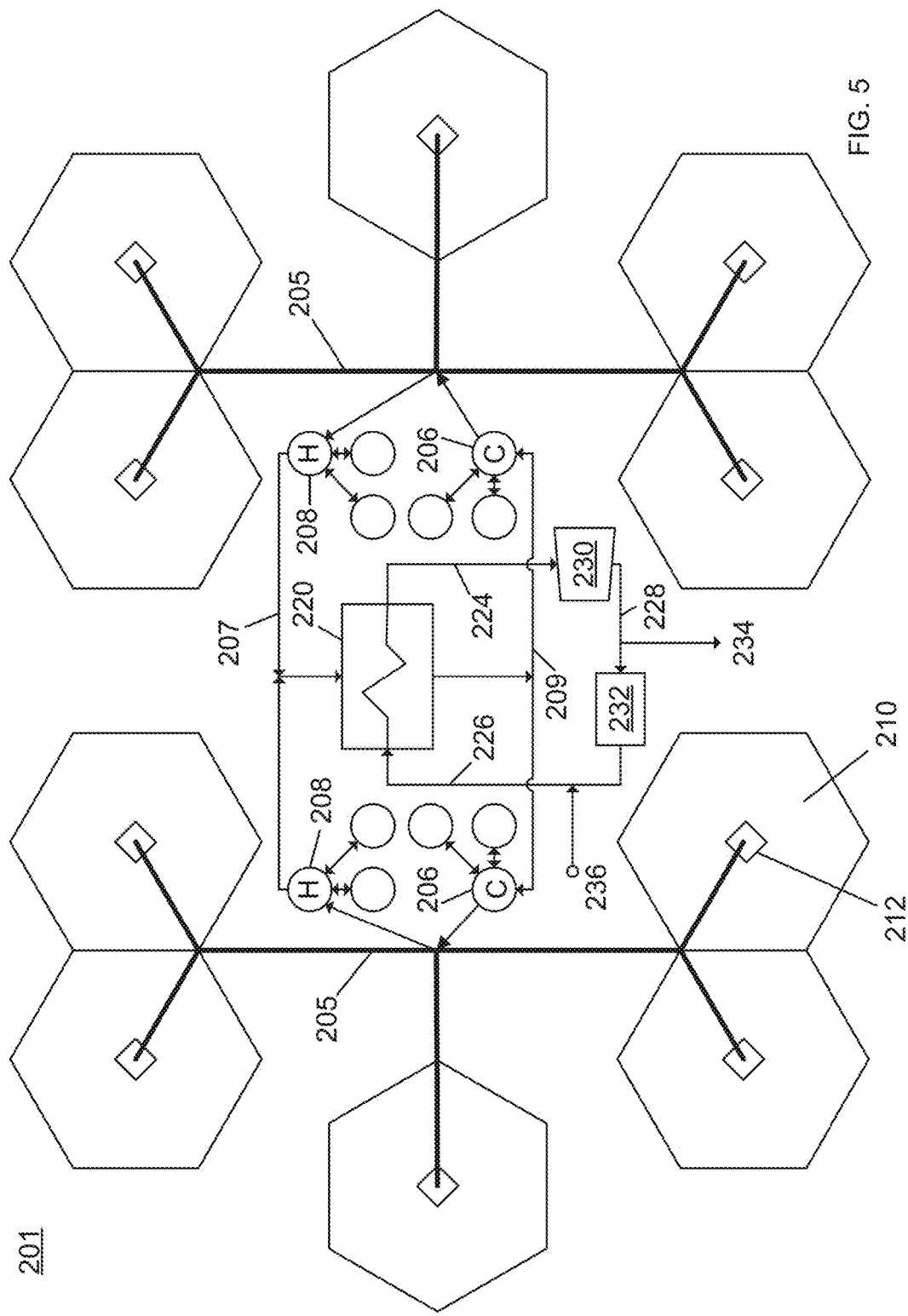
FIG. 5 is a schematic diagram of a molten salt solar thermal energy generation system of the present disclosure, operated at temperatures of about 850° F. or lower, used for cogeneration.

FIG. 5 is an exemplary embodiment of a molten salt solar thermal energy generation system 201 of the present disclosure, operated at temperatures of about 850° F. or lower, used for cogeneration. This drawing is also the same as FIG. 3 and FIG. 4, except illustrated here is a turbine 230, which receives steam 224 from the steam generation system 220. Part of the heat energy is converted to electrical power by the turbine-generator. Steam (reference numeral 228) at a lower temperature and/or lower pressure subsequently exits the turbine. This lower temperature/pressure steam is split into two paths. In one path denoted by reference numeral 234, the lower temperature/pressure steam is sent to a process. In the other path, the lower temperature/pressure steam is sent to an air cooled condenser 232 and reduced to feed water 226, which is returned to the steam generation system 220. Return water 236 from the process that received the steam 234 is also returned as feed water 226.

Figure 6:
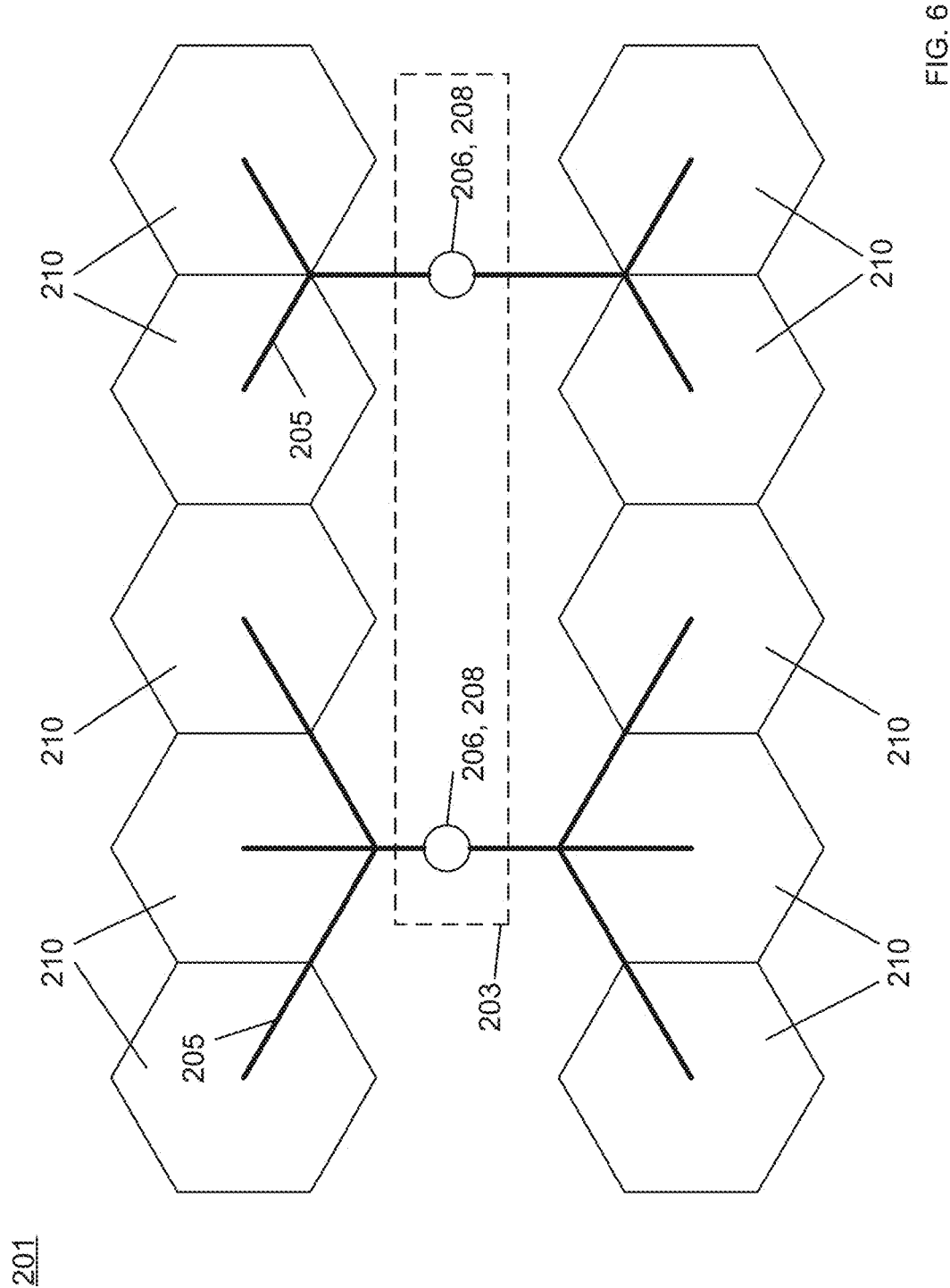
FIG. 6 is a top view schematic diagram of another general plant layout for a modular molten salt solar thermal energy generation system of the present disclosure, using ten heliostat fields laid out in two rows illustrating the molten salt piping with two sets of hot and cold modular storage tanks.

FIG. 6 is an alternative arrangement of the solar receivers/heliostat fields. Again, there are 10 heliostat fields 210 and a central location 203. Here, the heliostat fields are arranged in two rows on opposite sides of the central location 203, and there are no heliostat fields on the ends of the central location. There are two sets of hot and cold storage tanks 206, 208 connected to the solar receivers via piping 205. Each set of storage tanks serves a different number of heliostat fields (four and six, instead of both sets serving five as in FIG. 3). Thus, as discussed above, the tanks and pumps in one set of storage tanks may be of different volume and capacity than the tanks and pumps in the other set of storage tanks. Again, the steam generation system and power block (if required) would be located in the central location 203.

Figure 7:
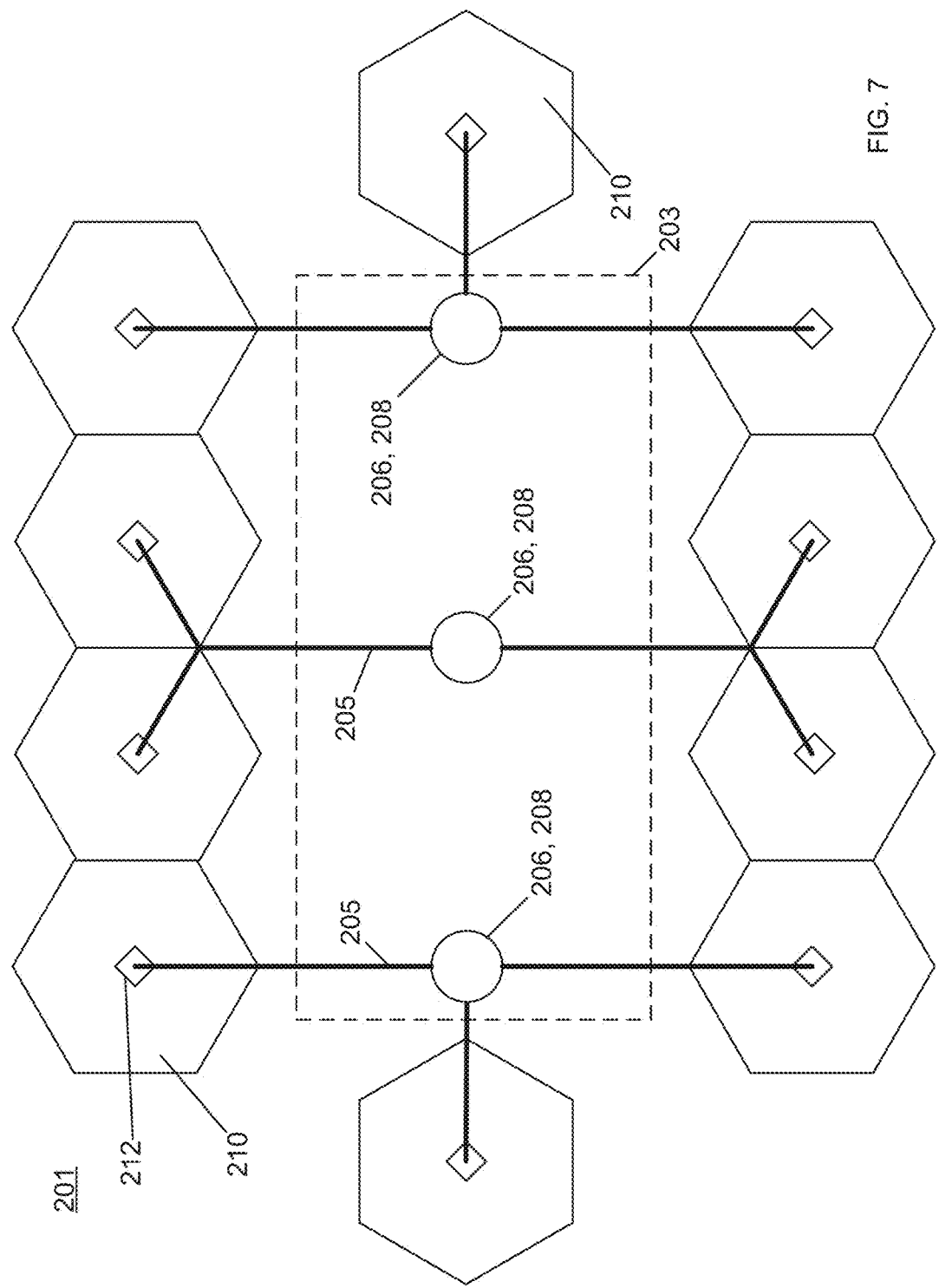
FIG. 7 is a top view schematic diagram of another general plant layout of a modular molten salt solar thermal energy generation system of the present disclosure, using ten heliostat fields laid out in a rectangle illustrating the molten salt piping with three sets of hot and cold modular storage tanks.

FIG. 7 is another alternative arrangement of the solar receivers/heliostat fields. Again, there are 10 heliostat fields 210 and a central location 203. Here, there are three sets of hot and cold storage tanks 206, 208 connected to the solar receivers via piping 205. Two sets of storage tanks at the ends serve three heliostat fields, while a central set of storage tanks serves four heliostat fields. Similar to FIG. 6, the volume and capacity of the storage tanks and pumps for each set of tanks may be different. All three sets of hot storage tanks 208 would feed hot fluid to the steam generation system, and all three sets of cold storage tanks 206 would receive cold fluid from the steam generation system afterwards. Again, the steam generation system and power block (if required) would be located in the central location 203.

FIG. 6 and FIG. 7 are just two examples of how the multiple sets of modular tanks can be used to reduce field piping for a ten tower system. This same concept can be used for any number of towers in order to reduce the amount of salt piping and simplify plant layout.

Figure 8:
FIG. 8 is a flow chart showing an exemplary method of using the molten salt solar thermal energy generation, thermal storage, and steam generation system of FIG. 1.

FIG. 8 is a flow chart showing an exemplary method 800 of using the solar power generation systems disclosed herein. The method 800 includes the steps of: providing a solar thermal energy generation system (Step 802); pumping a HTF from a set of cold storage tanks to a solar receiver (Step 804); heating the fluid to a maximum temperature of about 850° F. (Step 806); flowing the heated fluid to a set of hot storage tanks (Step 808); pumping the heated fluid to a steam generation system (Step 810); generating steam of a specified quality, temperature, and pressure using the heated fluid (Step 812); flowing the cooled fluid to the set of cold storage tanks (Step 814); and using the generated steam for a process, power generation or cogeneration (Step 816). These steps have been described in more detail above. It is noted that desirably, the heat transfer and storage fluid is molten salt with a low freeze point and a low chloride content.

Figure 9:
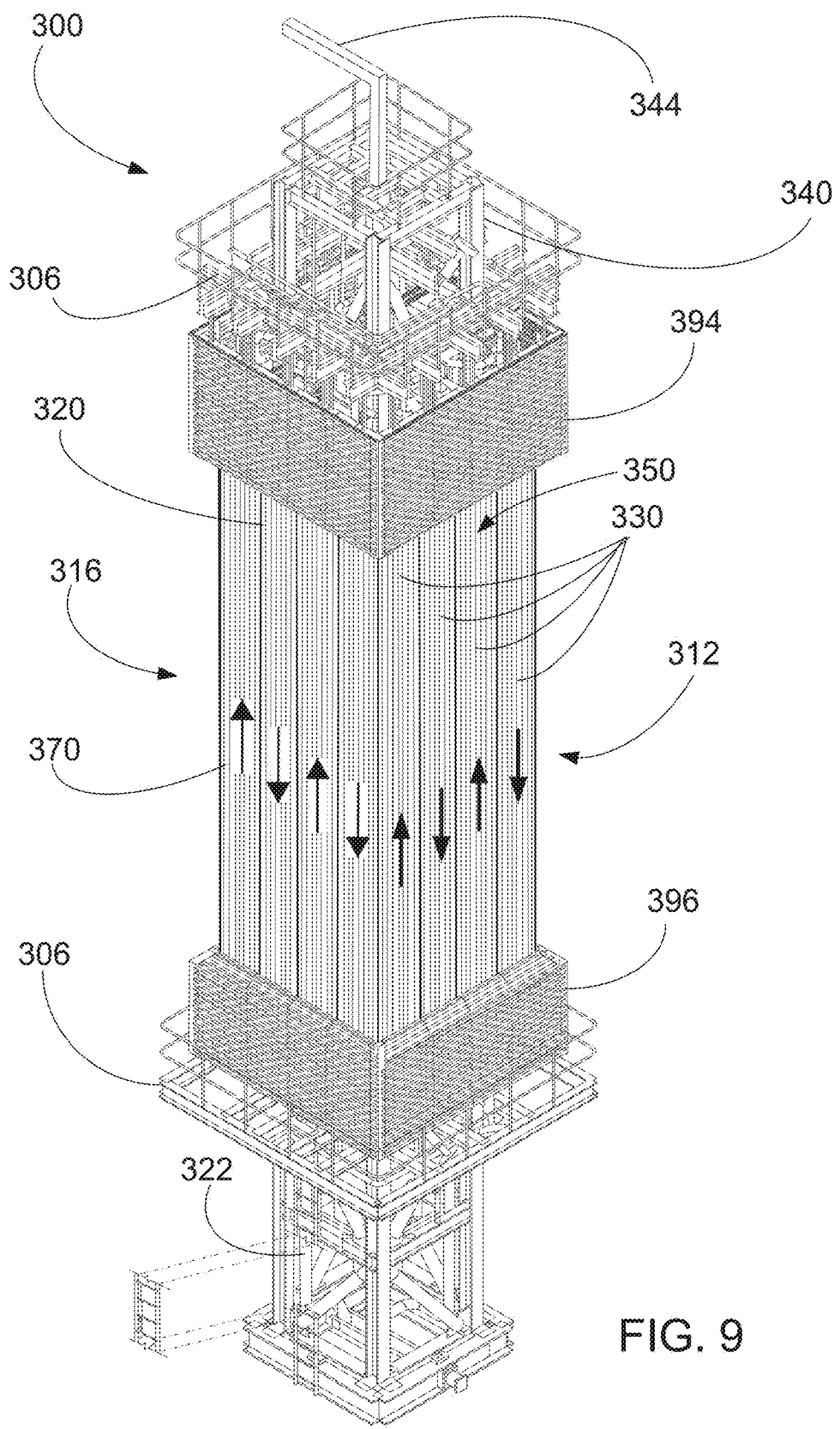
FIG. 9 is an exterior perspective view of an assembled solar receiver that can be used in the systems of the present disclosure. This view illustrates the arrangement of heat transfer surfaces (tube panels) on the exterior.
Figure 10:
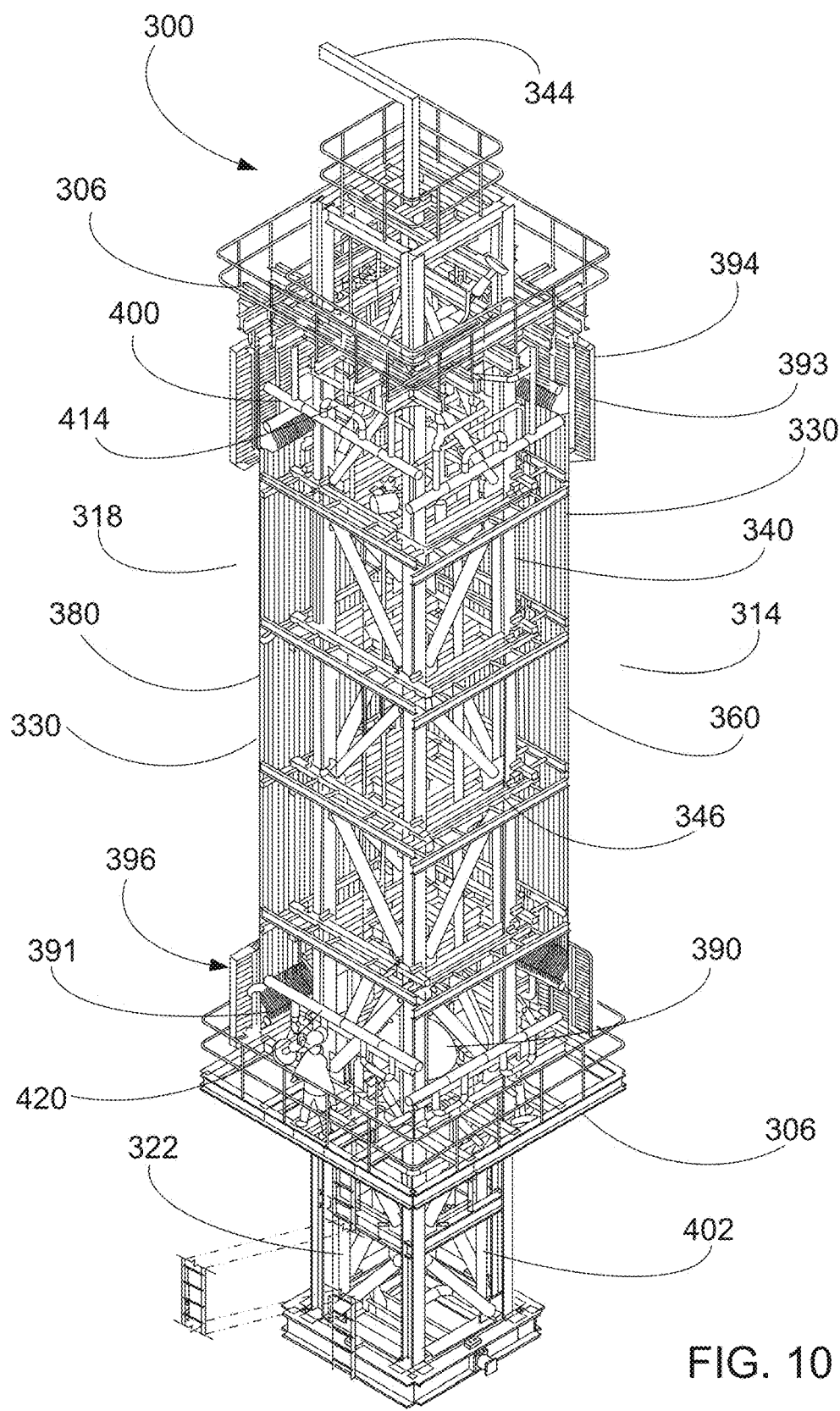
FIG. 10 is an interior perspective view of the assembled solar receiver of FIG. 9 and shows the arrangement of heat transfer surfaces, and a vertical support structure provided to top support the heat transfer surfaces.
Figure 11:
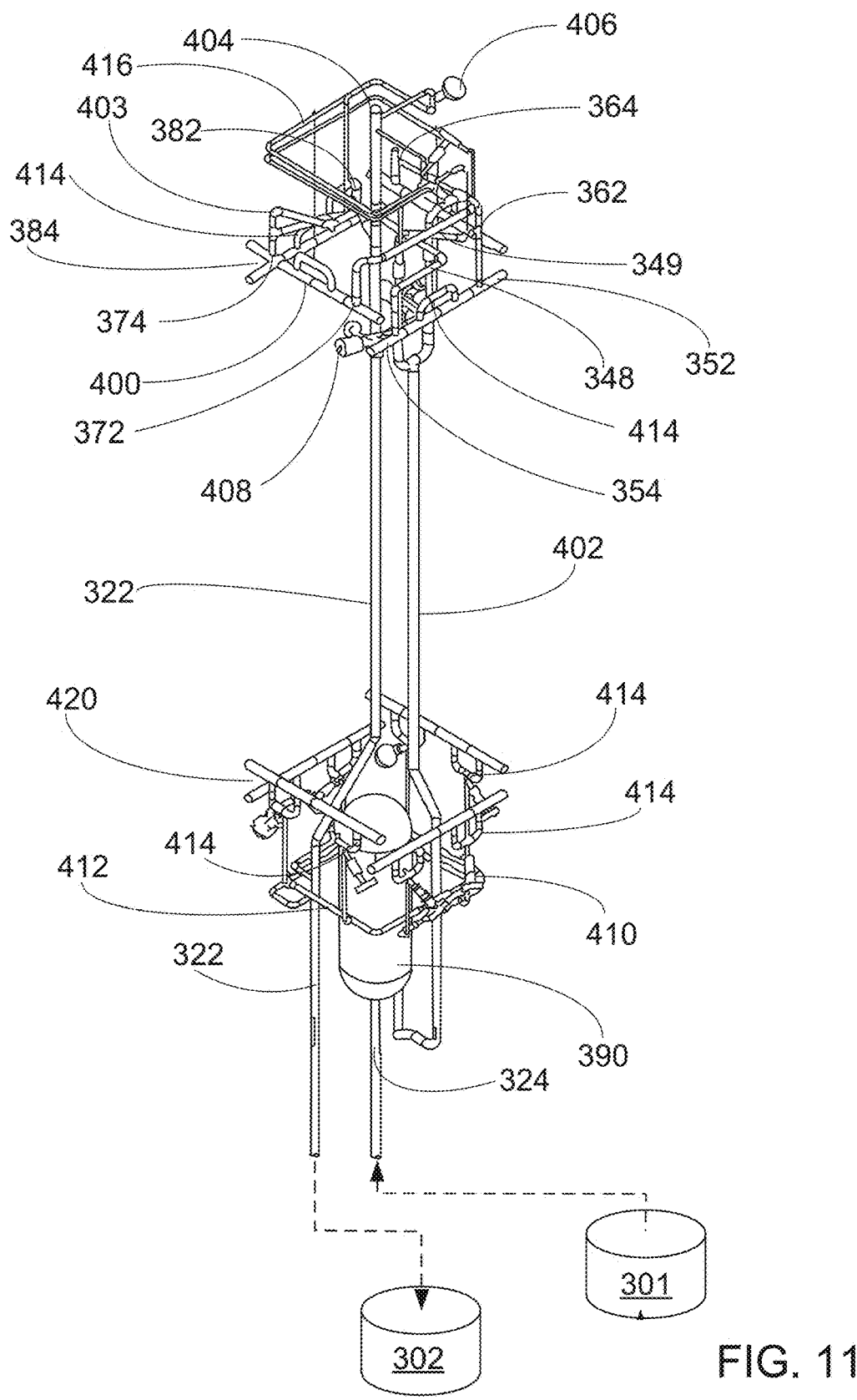
FIG. 11 is a diagrammatic view of the piping of the assembled solar receiver of FIG. 9, with various portions of the solar receiver removed for clarity.
Figure 12:
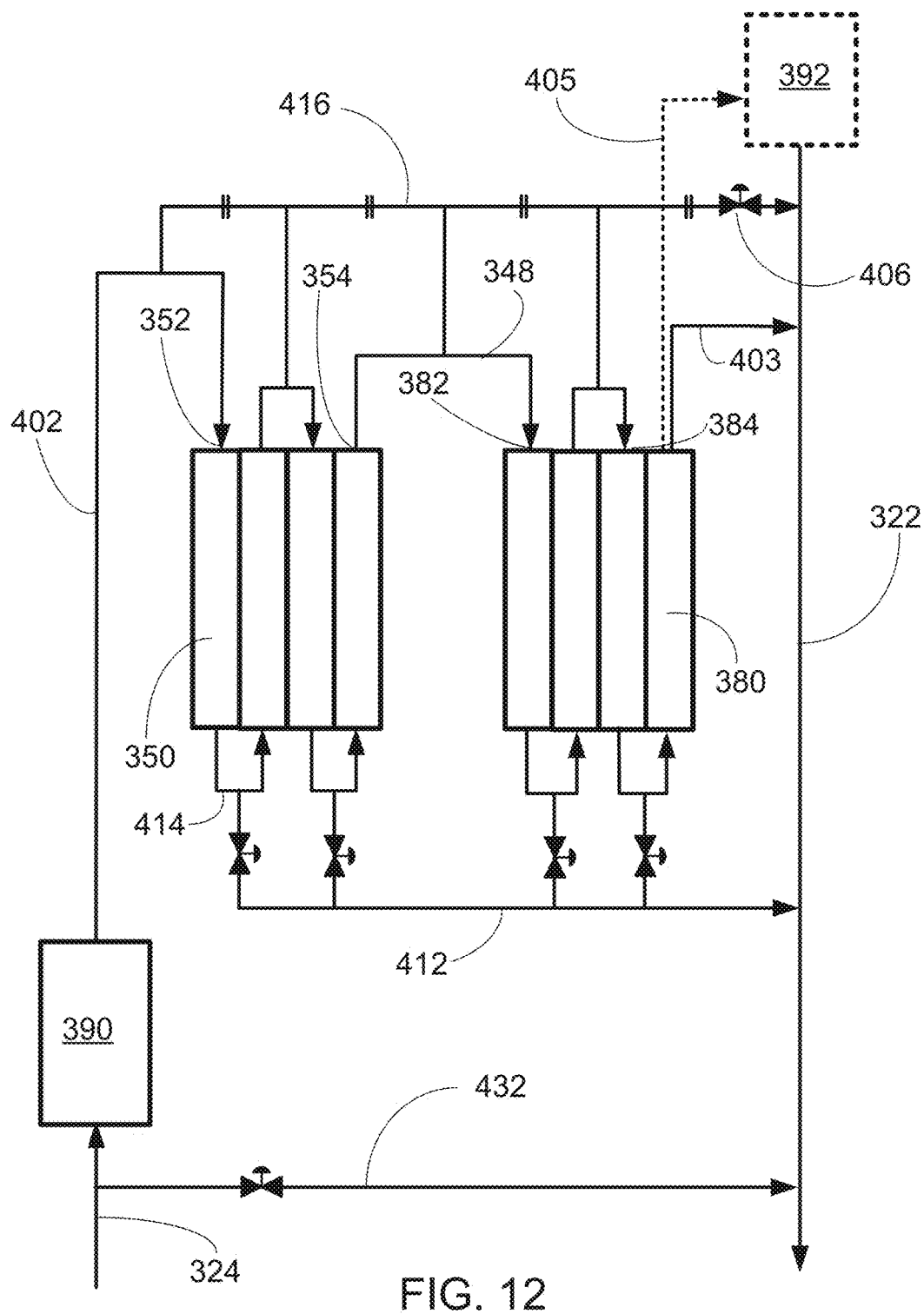
FIG. 12 is a schematic showing one of the two parallel independent molten salt flow paths for the solar receiver of the present disclosure.

FIGS. 9-12 illustrate various aspects of a solar receiver 300 of the present disclosure that can be used with the heliostat fields. FIG. 9 is an external perspective view. FIG. 10 is an interior perspective view that illustrates principally the support structure for the heat transfer surfaces. FIG. 11 shows certain pipes, vents, drains, and storage tanks that make up part of the solar receiver and thermal energy generation system. FIG. 12 shows one of two parallel independent flow paths of the molten salt HTF in the solar receiver.

When viewed from the top, the solar receiver in some specific embodiments has dimensions of approximately 11 feet by 11 feet on each side. When viewed from the side, the heat absorbing area of the solar receiver is approximately 38 feet high (i.e. a heat absorption height) by approximately 11 feet wide. The size of the receiver is relatively small compared to competitor units and facilitates maximum shop assembly and truck shippability in order to reduce field construction time and costs. It is contemplated that the receiver dimensions are flexible to some extent to meet thermal performance requirements while still achieving shop assembly and truck shippability.

Initially, FIG. 9 and FIG. 10 illustrate several structural components. The solar receiver 300 can be divided into four different quadrants. Each quadrant contains at least one facet 320, and each facet contains at least one tube panel. The northeast (NE) quadrant 312 and southeast (SE) quadrant 316 are visible in FIG. 9, along with NE facet 350 and SE facet 370. The northwest (NW) quadrant 314 and southwest (SW) quadrant 318 are visible in FIG. 10, along with NW facet 360 and SW facet 380.

Each facet is composed of one or more tube panels 330 which are organized so that the facet is planar, i.e. the tube panels are arranged to form a flat surface. The tube panels are connected to each other in series by interconnecting piping, such as jumper pipes 414 (see FIG. 10). The tube panels 330 are organized in a vertical or axial direction, such that the molten salt flows in an alternating up-down direction through the tube panels (indicated by the arrows in FIG. 9). This change in flow direction is referred to herein as a serpentine flow path. Again, each facet can have a height of from about 30 feet to about 40 feet. Each facet can have a width from about 11 feet to about 14 feet.

Continuing with FIG. 9 and FIG. 10, the vertical support structure 340 is visible as a set of beams and girders in the shape of a square. An upper heat shield 394 and a lower heat shield 396 cover the upper and lower structural steel portions above and below the tube panels 330. These shields 394, 396 protect these uncooled components from heat flux spillage that misses the heat absorbing surfaces of the tube panels (i.e. misaimed light from the heliostats). The heat shields extend around the perimeter of the solar receiver.

One end or edge of the heat shields is bolted or welded to the support structure 340 and the other end is free. The heat shields are made of thin gauge stainless steel with stiffeners on the interior side and along the free edge to resist wind and seismic loads. The heat shields may also be joined at the corners to provide additional stiffness to avoid attachment to the tubes. Provisions for thermal expansion to reduce or prevent buckling are present. The heat shields are reflective (e.g. painted white) on the exposed side and are not insulated on the interior side to reduce operating temperature. A gap is provided between the heat shields and tube panels to allow natural circulation of air for additional cooling. To reduce shipping dimensions, the shields may be field installed.

Remaining with FIG. 9 and FIG. 10, an upper oven cover 393 encloses the upper headers 400 and upper tube bends of the facets, while a lower oven cover 391 encloses the lower headers 420 and lower tube bends of the facets. The oven covers are themselves covered by the heat shields 394, 396. The oven covers 391, 393 preheat those areas of the receiver panels that are not exposed to the concentrated solar heat flux. Electric heaters are used to preheat insulated tube panel bends and headers. Preheating is necessary at startup to ensure that all metal which comes in contact with salt is heated to above the salt freeze point before salt is introduced to the solar receiver, thus preventing salt freezes that can cause blockage and damage components. In this regard, it should be noted that the oven covers could be rigid insulated boxes with electric heater elements inside the box, or could alternatively be a soft cover such as an insulated heating blanket.

As best seen in FIG. 10, a toggling buckstay support system 346 is used to attach each tube panel 330 to the vertical support structure 340. This system provides the tube panels with horizontal (lateral) stability while allowing the tubes to independently and freely expand vertically (axially), which reduces tube stresses. All tube panels are top supported and hung from the support structure 340 that is internal to the receiver. It should be noted that the headers of adjacent tube panels on each facet at each level (upper/lower) are laterally separated (horizontally) from each other. Separating the headers of each facet allows each tube panel to expand differentially, which is necessary to reduce stresses since each tube panel 330 will be operating at a higher temperature than the previous panel. All tube panels are composed of thin-walled, loose, tangent tubes which allow tube-to-tube differential expansion and reduced tube stresses. The tube attachments allow for unrestrained thermal expansion of the tube panels in both the horizontal and vertical directions, thereby eliminating additional tube stresses. These design features maximize flexibility and minimize thermal stresses and the potential for tube bowing. The tubes may be coated, such as painted black, in order to enhance solar energy absorption. A light absorbing black paint or oxide can be used for this purpose.

Finally, in FIG. 9 and FIG. 10, a crane 344 is located at the top or peak of the solar receiver to facilitate tube or panel replacement. An access platform 306 is present at the bottom of the facets/tube panels, and another access platform is present above the facets/tube panels. Platforms may also be located at each buckstay elevation. Inlet vessel 390, downcomer pipe 322, and inlet pipe 402 are also visible in FIG. 10, and will be explained further herein.

FIG. 11 and FIG. 12 illustrate the flow path of the HTF. This will be described using molten salt as the HTF.

Turning first to FIG. 11, "cold" molten salt is pumped up the tower from a cold storage tank 301 through the riser pipe 324 into the inlet vessel 390, which acts as a pressurized reservoir of excess molten salt. In the event salt flow to the tower is stopped due to pump failure or some other reason, the molten salt in the inlet vessel 390 can continue to provide salt flow and cooling to the facets of the solar receiver while heat is removed from the tubes by redirecting the heliostats to focus away from the solar receiver. From the inlet vessel 390, molten salt flows through inlet pipe 402 to the northern corner of the receiver and splits into two parallel flow paths. One of the flow paths enters the NE facet inlet 352 and the other flow path enters the NW facet inlet 362. Generally speaking, the inlets for the two flow paths are located in a common corner. The locations of the inlets depend on the direction of molten salt flow through the receiver. The direction of molten salt flow is north-to-south if the receiver is located in the northern hemisphere and south-to-north if in the southern hemisphere. Inside the NE facet and the NW facet, the salt is heated by the concentrated solar energy from the heliostat field that is focused on the tubes in the tube panels. The upper headers 400, lower headers 420, and jumper pipes 414 are illustrated to provide a reference point for the tube panels.

The molten salt from the NE quadrant is subsequently "crossed over" to the SW quadrant, and the molten salt from the NW quadrant is "crossed over" to the SE quadrant. The cross-overs are intended to balance east/west differences in salt temperature caused by the natural east-to-west variation in solar absorption. Salt heating continues in the SE and SW quadrants, which are also composed of multiple up-down serpentine style tube panels.

The piping for this cross-over is seen in FIG. 11. A first crossover pipe 348 fluidly connects the NE facet outlet 354 to the SW facet inlet 382. A second crossover pipe 349 fluidly connects the NW facet outlet 364 to the SE facet inlet 372. Molten salt subsequently exits the SE facet outlet 374 and the SW facet outlet 384 at a southern corner. This molten salt has a temperature of about 850° F. or less, and is piped directly to the downcomer pipe 322. An outlet pipe 403 fluidly connects the SE and SW facet outlets to the downcomer pipe 322.

The downcomer pipe operates at atmospheric pressure and is vented to atmosphere (indicated by reference numeral 404). The salt then flows by gravity down the tower and to the hot storage tank 302. This completes the energy collection process. The stored thermal energy in the hot molten salt can be used at the plant's discretion to generate steam and/or electricity.

FIG. 12 is a diagram showing the flow of molten salt through one of the two parallel independent flow paths in the solar receiver, the flow path through the NE and SW facets. Initially, the inlet vessel 390 is located below the facets 350, 380 (each of which have four tube panels). The jumper pipes 414 between tube panels are shown. A riser pipe 324 provides "cold" molten salt to the inlet vessel 390. An inlet pipe 402 fluidly connects the inlet vessel 390 to the NE facet inlet 352. The NE facet outlet 354 is fluidly connected to the SW facet inlet 382 through a crossover pipe 348. An outlet pipe 403 fluidly connects the SW facet outlet 384 to the downcomer pipe 322.

There may also be a bypass line that allows molten salt to bypass the solar receiver facets altogether, by connecting the inlet pipe 402 to the downcomer pipe 322. Typically this is done at startup while the facets and oven covers are being preheated to reduce the risk of salt freezes in the panels, or is done overnight to keep the tower piping warm to avoid energizing the heat tracing. The bypass line 432 connects the riser 324 to the downcomer pipe 322 upstream of the inlet vessel 390. The bypass line can be located at a low elevation closer to grade or within the tower upon which the solar receiver is perched. A valve controls the flow through the bypass line.

A similar flow path is present for the NW and SE facets in the solar receiver, though not illustrated. A second inlet pipe fluidly connects the inlet vessel to the NW facet inlet. It should be noted that one common pipe typically exits the inlet vessel, and then splits to form two inlet pipes that feed the two flow paths. The NW facet outlet is fluidly connected to the SE facet inlet through a second crossover pipe. A second outlet pipe fluidly connects the SE facet outlet to the downcomer pipe. Molten salt can flow from the inlet vessel through the NW facet and the SE facet to the downcomer pipe 322.

In some embodiments, an outlet vessel 392 may be located between the facets 380 and the downcomer pipe 322. FIG. 12 includes the optional outlet vessel 392 in dotted line. Rather than going directly to downcomer pipe 322, molten salt travels through outlet pipe 405 from the SW facet 380 to the outlet vessel 392, and subsequently to downcomer pipe 322.

The facets/tube panels of the solar receiver are fully drainable and ventable. The receiver is usually drained when not in use, at sunset, or when available solar energy is too low. Conventional molten solar salt solidifies at approximately 430° F. (221° C., 494° K). If not drained, the salt (conventional or lower freeze point types) can freeze inside the tubes and plug the receiver. As seen in FIG. 11 and FIG. 12, the solar receiver can include a vent valve 406 for each independent flow path. The vent valve is typically located near the top of the downcomer pipe 322, and the vent piping 416 is also illustrated connecting the flow path to the downcomer pipe.

A flow control valve 408 is also shown for each independent salt flow path. The flow control valve automatically and independently modulates the flow of the molten salt to control the final temperature of the molten salt as it exits the flow path to meet a setpoint temperature. The flow control valve is typically located at the inlet where cold salt is supplied to the flow path.

The solar receiver can also include drain valves 410. One drain valve is typically provided for each pair of tube panels, and are located beneath the tube panels. The drain piping 412 is also illustrated, and connects to the downcomer 322 so that molten salt present in the tube panels drains and flows into the downcomer pipe 322. The vent valves, flow control valves, and drain valves are automated.

Referring again to FIG. 11, each tube panel includes an inlet header and an outlet header. The tube panels are aligned so that the headers are arranged in a group of lower headers 420 and upper headers 400. The jumper pipes 414 between adjacent headers are also illustrated.

Here, the headers of the tube panels in the NW flow quadrant and the SE flow quadrant are at a higher elevation than those of the tube panels in the NE flow quadrant and the SW flow quadrant. The headers and tube bends of the various tube panels can thus overlap. This reduces the shipping dimensions of the receiver, allowing truck shippability and also allows easier access from inside the receiver for tube repair/replacement. More generally, the upper headers in one facet are at a different elevation from the upper headers in an adjacent facet, and the lower headers in the one facet are also at a different elevation from the lower headers in the adjacent facet. Indeed, the upper headers and the lower headers of the one facet are at a different elevation than the upper headers and the lower headers in both adjacent facets. As the height of the tube panels is usually the same for the facets, this means that, for example, if the upper headers in the NW flow quadrant are at a higher elevation than the upper headers in the NE flow quadrant, then the lower headers in the NW flow quadrant are also at a higher elevation than the lower headers in the NE flow quadrant. The elevation is relative to grade.

The quantities of the tube panels and the tube sizes are designed to provide adequate cooling for a given solar receiver thermal rating and corresponding salt flow. However, the solar receiver of the present disclosure is flexible and different quantities of tube panels and/or other tube sizes are possible depending on the desired thermal rating of the solar receiver and the corresponding salt flow as long as tube metal temperatures and stresses are acceptable. While FIG. 9 illustrates a square solar receiver (in the plan view), other plan geometries are possible: e.g. circular, rectangular, hexagonal, octagonal, n-sided polygon, etc. It is believed that a square receiver offers the advantage of maximizing heating surface area while still being compact which reduces shipping costs. It should be noted that a square receiver is a special case of a rectangular geometry.

While the pipes are illustrated as being relatively straight fluid paths, it will be appreciated by those skilled in the art that their actual design in terms of arrangement and length will be determined by the degree of flexibility required to accommodate expected motions caused by thermal expansion and contraction during operation of the solar receiver. It is thus likely that additional bends or length may be necessary to provide such flexibility.

Since the solar receiver is shop-assembled, and will be transported horizontally and then erected into a vertical position, it is important to provide for adequate support of the tangent tube panels during and in between both conditions. The solar receiver can be shipped in the horizontal position using a shipping fixture that is also used to shop-assemble the solar receiver, and it ensures proper lifting when up-righting the receiver in the field which prevents receiver damage. The shipping fixture is constructed from a series of beams and rails that form a base structure upon which the solar receiver is shipped. Braced pedestals with bearings are present on one end of the shipping fixture to support the bottom end of the solar receiver. This feature allows the receiver to be up-righted and lifted off of the shipping fixture with one crane.

Figure 13:
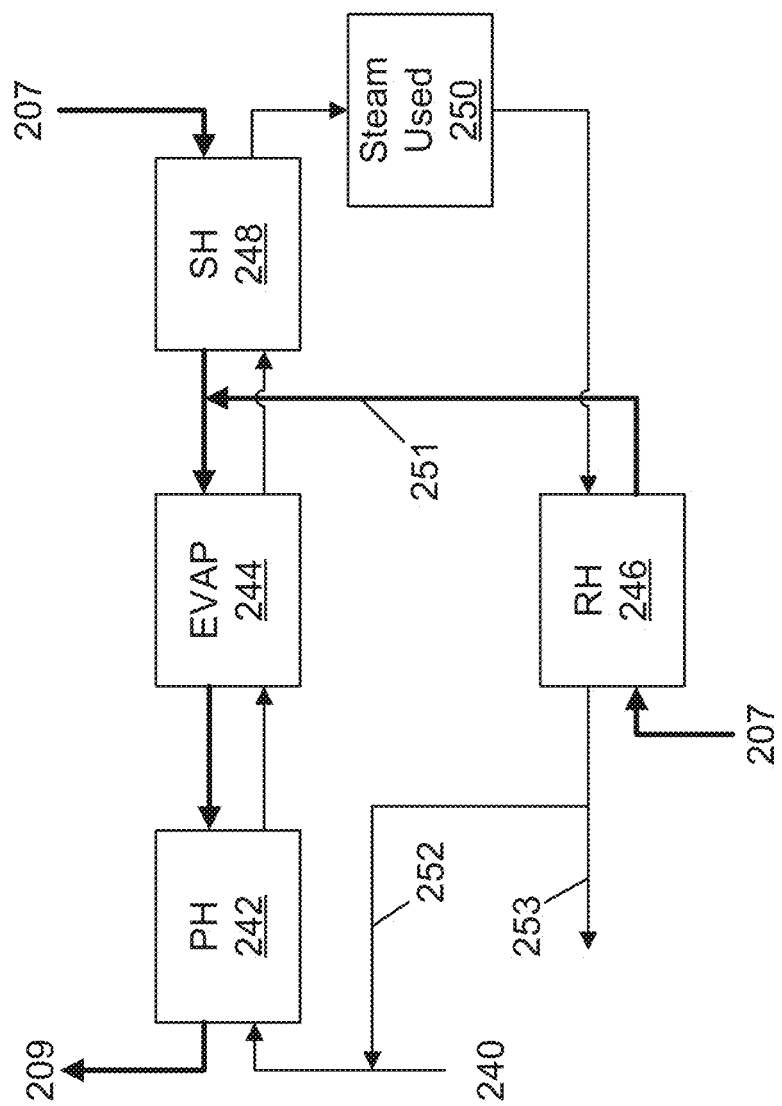
FIG. 13 is a schematic diagram showing components of a steam generation system that can be used with the molten salt solar thermal energy generation systems of the present disclosure.

FIG. 13 is a schematic diagram illustrating fluid flow through a steam generation system 220 (SGS) like that used in FIGS. 3-7. Briefly, feedwater 240 flows sequentially through a preheater 242, an evaporator 244, and a superheater 248 to generate steam, which is then used for power or non-power applications (indicated by reference numeral 250). In some instances, the use can result in lower temperature/pressure steam, which can be sent to reheater 246 to absorb additional heat energy, which can then be recycled as feedwater through path 252 or can be used in another process through path 253. The feedwater runs countercurrent to the molten salt. Hot fluid (molten salt) 207 from the hot storage tanks flows sequentially through superheater 248, evaporator 244, and preheater 242 and exits as cold fluid 209, which is sent to the set of cold storage tanks. Hot fluid 207 can also flow through the reheater 246 to reheat steam, with the fluid then being sent via path 251 to evaporator 244. It is noted that the preheater, evaporator, superheater and reheater heat exchangers are all shop-assembled and truck-shippable, allowing faster installation at reduced cost. This permits various layouts of these components to reduce long runs of salt piping. The SGS shown in FIG. 13 depicts a typical arrangement for power production. As described earlier, the type and arrangement of the heat exchangers comprising the SGS depends on the steam and feedwater conditions required by the application. For example, a process application may only require only a preheater and evaporator but could also require a superheater.

The present disclosure has been described with reference to exemplary embodiments, and is not intended to be limited to only the foregoing examples. Obviously, modifications and alterations will occur to others upon reading and understanding the preceding detailed description. In some embodiments of the present disclosure, certain features described herein may sometimes be used to advantage without a corresponding use of the other features. It is intended that the present disclosure be construed as including all such modifications and alterations insofar as they come within the scope of the appended claims or the equivalents thereof.

The invention claimed is:

1. A solar thermal energy generation and storage system, comprising:
   (A) a plurality of heliostat fields surrounding a central location, wherein each heliostat field comprises:
      (i) a solar receiver comprising a plurality of tube panels arranged on an exterior of a support structure, the tube panels being fluidly connected to form at least one flow path; and
      (ii) a first plurality of heliostats arranged around the solar receiver;
   (B) a first set of cold storage tanks configured to supply heat transfer fluid to at least one solar receiver in the plurality of heliostat fields; and
   (C) a first set of hot storage tanks configured to receive heat transfer fluid from at least one solar receiver in the plurality of heliostat fields;
   wherein the first set of cold storage tanks comprises at least one cold fluid storage tank and at least one cold fluid pump tank, the at least one cold fluid pump tank having at least one pump to send the heat transfer fluid to the first solar receiver, and wherein the at least one cold fluid storage tank does not have a pump and is fluidly connected only to the at least one cold fluid pump tank.

2. The system of claim 1, further comprising a steam generation system that receives heat transfer fluid from the first set of hot storage tanks.

3. The system of claim 1, wherein the first set of cold storage tanks comprises a plurality of cold fluid storage tanks and only one cold fluid pump tank.

4. The system of claim 1, wherein the system further comprises hot salt piping; and wherein the first set of hot storage tanks and the hot salt piping are made from a chromium-molybdenum steel alloy, carbon steel, or a metal of lower grade than austenitic stainless steel.

5. The system of claim 1, wherein the first set of cold storage tanks and the first set of hot storage tanks each have a height of about 100 feet or less and a diameter of about 14 feet or less, such that the tanks can be shipped by truck.

6. The system of claim 1, wherein the central location contains a steam generation system, the first set of cold storage tanks, and the first set of hot storage tanks.

7. The system of claim 6, wherein the steam generation system comprises (i) only an evaporator; (ii) a preheater and an evaporator; (iii) a preheater, an evaporator, and a superheater; or (iv) a preheater, an evaporator, a superheater, and a reheater.

8. The system of claim 7, wherein the superheater or the reheater are made from a chromium-molybdenum steel alloy, carbon steel, or a metal of lower grade than austenitic stainless steel.

9. The system of claim 7, wherein the evaporator is made from carbon steel or a metal of lower grade than chromium-molybdenum steel alloy.

10. The system of claim 1, wherein the system comprises a plurality of sets of cold storage tanks and a plurality of sets of hot storage tanks, wherein the plurality of sets of cold storage tanks together supply heat transfer fluid to each solar receiver in the plurality of heliostat fields, and wherein the plurality of sets of hot storage tanks together receive heat transfer fluid from each solar receiver in the plurality of heliostat fields.

11. The system of claim 1, wherein (i) the tube panels of the at least one solar receiver, (ii) piping from the at least one solar receiver to the first set of hot storage tanks, and (iii) the first set of hot storage tanks are configured to handle heat transfer fluid having a maximum temperature of about 850° F.

12. The system of claim 1, further comprising a steam generation system comprising modular truck-shippable heat exchangers, a superheater, a reheater, an evaporator, and a preheater which receive the heat transfer fluid having a maximum temperature of about 850° F. and feedwater to generate steam from the feedwater; wherein the heat transfer fluid subsequently flows to the first set of cold storage tanks.

13. The system of claim 1, wherein the heliostat fields are arranged in a single perimeter around the central location or along any side of the central location so that the heliostat fields are next to the central location.

14. The system of claim 1, wherein the heliostat fields are arranged on all sides of the central location along a single perimeter.

15. A solar thermal energy generation and storage system, comprising:
   (A) a plurality of heliostat fields surrounding a central location, wherein each heliostat field comprises:
      (i) a solar receiver comprising a plurality of tube panels arranged on an exterior of a support structure, the tube panels being fluidly connected to form at least one flow path; and
      (ii) a first plurality of heliostats arranged around the solar receiver;
   (B) a first set of cold storage tanks configured to supply heat transfer fluid to each solar receiver in the plurality of heliostat fields; and
   (C) a first set of hot storage tanks configured to receive heat transfer fluid from each solar receiver in the plurality of heliostat fields;
   wherein the first set of cold storage tanks comprises at least one cold fluid storage tank and at least one cold fluid pump tank, the at least one cold fluid pump tank having at least one pump to send the heat transfer fluid to the first solar receiver, and wherein the at least one cold fluid storage tank does not have a pump and is fluidly connected only to the at least one cold fluid pump tank; and
   wherein the first set of hot storage tanks comprises at least one hot fluid storage tank and at least one hot fluid pump tank, the at least one hot fluid pump tank having at least one pump to send the heated heat transfer fluid to the steam generation system, and wherein the at least one hot fluid storage tank does not have a pump and is fluidly connected only to the at least one hot fluid pump tank.

16. A solar thermal enemy generation and storage system, comprising:
- (A) a plurality of heliostat fields surrounding a central location, wherein each heliostat field comprises:
  - (i) a solar receiver comprising a plurality of tube panels arranged on an exterior of a support structure, the tube panels being fluidly connected to form at least one flow path; and
  - (ii) a first plurality of heliostats arranged around the solar receiver;
- (B) a first set of cold storage tanks configured to supply heat transfer fluid to at least one solar receiver in the plurality of heliostat fields; and
- (C) a first set of hot storage tanks configured to receive heat transfer fluid from at least one solar receiver in the plurality of heliostat fields wherein the first set of hot storage tanks comprises at least one hot fluid storage tank and at least one hot fluid pump tank, the at least one hot fluid pump tank having at least one pump to send the heated heat transfer fluid to the steam generation system, and wherein the at least one hot fluid storage tank does not have a pump and is fluidly connected only to the at least one hot fluid pump tank.

17. The system of claim 16, wherein the first set of hot storage tanks comprises a plurality of hot fluid storage tanks and only one hot fluid pump tank.

* * * * *